US010036650B2

(12) United States Patent
Chintakindi et al.

(10) Patent No.: US 10,036,650 B2
(45) Date of Patent: **\*Jul. 31, 2018**

(54) DATA PROCESSING SYSTEM COMMUNICATING WITH A MAP DATA PROCESSING SYSTEM TO GENERATE A DISPLAY OF ONE OR MORE SEGMENTS OF ONE OR MORE VEHICLE ROUTES

(71) Applicant: Allstate Insurance Company, Northbrook, IL (US)

(72) Inventors: Sunil Chintakindi, Naperville, IL (US); Howard Hayes, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,693

(22) Filed: Jan. 19, 2017

(65) Prior Publication Data

US 2017/0191846 A1    Jul. 6, 2017

Related U.S. Application Data

(63) Continuation of application No. 15/182,920, filed on Jun. 15, 2016, now Pat. No. 9,581,461, which is a
(Continued)

(51) Int. Cl.
*G06Q 40/08* (2012.01)
*G01C 21/36* (2006.01)
(Continued)

(52) U.S. Cl.
CPC ....... *G01C 21/367* (2013.01); *G01C 21/3492* (2013.01); *G01C 21/3691* (2013.01);
(Continued)

(58) Field of Classification Search
CPC ............. G01C 21/367; G01C 21/3415; G08G 1/0112; G06Q 40/08; G06Q 40/06; B60Q 9/00
(Continued)

(56) References Cited

U.S. PATENT DOCUMENTS 8,332,242 B1 * 12/2012 Medina, III ........... G06Q 40/08
705/35
9,581,461 B1    2/2017 Chintakindi et al.
(Continued)

OTHER PUBLICATIONS

Aug. 18, 2016—(U.S.) Non-Final Office Action—U.S. Appl. No. 15/182,955.
(Continued)

*Primary Examiner* — Yuri Kan
(74) *Attorney, Agent, or Firm* — Banner & Witcoff, Ltd.

(57) ABSTRACT

Systems and methods are disclosed for generating a display of a navigation map. The system may comprise a historical data source device having, for example, a historical data source computer and a database storing historical data associated with one or more of vehicle accident data, traffic data, vehicle volume data, vehicle density data, road characteristic data, or weather data. The system may comprise a map data processing device having a map data processing computer and memory storing computer-executable instructions that, when executed by the map data processing computer, cause the map data processing device to, for example, determine, based on a location determining device, a location of a vehicle. The map data processing system may determine one or more historical factors based on the location of the vehicle. The map data processing system may receive, from the historical data source device and for the location, historical data associated with the one or more historical factors. Based on the location of the vehicle, one or more real time factors and real time data associated with the one or more real time factors may be calculated. The map
(Continued)

data processing system may calculate, using the one or more historical factors and the one or more real time factors, a navigation score for each segment of a route from the location to a destination location. The map data processing system may determine one or more colors for each navigation score and/or generate a display of a navigation map comprising the one or more colors.

20 Claims, 3 Drawing Sheets

Related U.S. Application Data continuation of application No. 15/182,955, filed on Jun. 15, 2016.

(60) Provisional application No. 62/274,888, filed on Jan. 5, 2016, provisional application No. 62/274,835, filed on Jan. 5, 2016.

(51) Int. Cl.
  *G01C 21/34* (2006.01)
  *G06F 3/0484* (2013.01)
  *G06T 11/00* (2006.01)

(52) U.S. Cl.
  CPC ...... *G06F 3/04842* (2013.01); *G06F 3/04847* (2013.01); *G06T 11/001* (2013.01); *G06T 2200/24* (2013.01)

(58) Field of Classification Search
  USPC ............ 701/423, 117, 118; 705/4, 36 R; 340/905
  See application file for complete search history.

(56) References Cited

U.S. PATENT DOCUMENTS

| | | | | |
|---|---|---|---|---|
| 2002/0016667 | A1* | 2/2002 | Baur | G01C 21/3415 701/117 |
| 2003/0060977 | A1 | 3/2003 | Jijina et al. | |
| 2009/0271325 | A1* | 10/2009 | Wilson | G06Q 40/06 705/36 R |
| 2013/0226441 | A1* | 8/2013 | Horita | B60O 9/00 701/118 |
| 2014/0062725 | A1* | 3/2014 | Maston | G08G 1/0112 340/905 |
| 2016/0171621 | A1* | 6/2016 | Bogovich | G06Q 40/08 705/4 |

OTHER PUBLICATIONS

Aug. 30, 2016—(U.S.) Non-Final Office Action—U.S. Appl. No. 15/182,920.
Oct. 26, 2016—(U.S.) Notice of Allowance—U.S. Appl. No. 15/182,920.
Dec. 19, 2016—(U.S.) Final Office Action—U.S. Appl. No. 15/182,955.
Feb. 2, 2017 (PCT) Notification of Transmittal of the International Search Report and the Written Opinion—App PCT/US17/12016.

* cited by examiner

DATA PROCESSING SYSTEM COMMUNICATING WITH A MAP DATA PROCESSING SYSTEM TO GENERATE A DISPLAY OF ONE OR MORE SEGMENTS OF ONE OR MORE VEHICLE ROUTES

CROSS-REFERENCE TO RELATED APPLICATIONS

This application is a continuation of pending U.S. patent application Ser. No. 15/182,920, filed Jun. 15, 2016 and entitled "Data Processing System Communicating with a Map Data Processing System to Generate a Display of One or More Segments of One or More Vehicle Routes," which claims priority to U.S. Provisional Patent Application Ser. No. 62/274,888, filed Jan. 5, 2016 and entitled "Live Risk Map," and to U.S. Provisional Patent Application Ser. No. 62/274,835, filed Jan. 5, 2016 and entitled "Multi-Dimensional Risk Scoring Model." This application is a continuation of pending U.S. patent application Ser. No. 15/182,955, filed Jun. 15, 2016 and entitled "Data Processing System Communicating with a Map Data Processing System to Determine or Alter a Navigation Path Based on One or More Road Segments," which claims priority to U.S. Provisional Patent Application Ser. No. 62/274,888, filed Jan. 5, 2016 and entitled "Live Risk Map," and to U.S. Provisional Patent Application Ser. No. 62/274,835, filed Jan. 5, 2016 and entitled "Multi-Dimensional Risk Scoring Model." Each of the aforementioned applications is herein incorporated by reference in its entirety.

TECHNICAL FIELD

Aspects of the disclosure generally relate to computing systems generating dynamic or risk maps by accessing real time data and/or historical data from various data sources. A data processing system may communicate with a map data processing system to generate a display of one or more segments of one or more vehicle routes, such as using one or more colors for one or more segments of the route(s).

BACKGROUND

Mapping services that display traffic conditions and driving routes are known. However, these existing mapping services do not display enough information for some use cases.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices configured for generating a display of a navigation map. The system may comprise a historical data source device having, for example, a historical data source computer and a database storing historical data associated with one or more of vehicle accident data, traffic data, vehicle volume data, vehicle density data, road characteristic data, or weather data. The system may comprise a map data processing device having a map data processing computer and memory storing computer-executable instructions that, when executed by the map data processing computer, cause the map data processing device to, for example, determine a location of a vehicle based on a location determining device. The location of the vehicle may be received from the location determining device of a mobile computing device and/or the vehicle. The map data processing system may determine one or more historical factors based on the location of the vehicle. The map data processing system may receive, from the historical data source device and for the location, historical data associated with the one or more historical factors. Based on the location of the vehicle, one or more real time factors and real time data associated with the one or more real time factors may be calculated. The map data processing system may calculate, using the one or more historical factors and the one or more real time factors, a navigation score for each segment of a route from the location to a destination location. The map data processing system may determine one or more colors for each navigation score and/or generate a display of a navigation map comprising the one or more colors.

In some aspects, the memory may store computer-executable instructions that, when executed by the map data processing computer, cause the map data processing device to recalculate at least one of the navigation score in response to an update to the real time data. Additionally or alternatively, the memory may store computer-executable instructions that, when executed by the map data processing computer, cause the map data processing device to determine that the navigation score for a segment of the route increases by more than a threshold value. In response to determining that the navigation score for the segment of the route increases by more than the threshold value, a new color for the segment of the route may be determined and/or the display of the navigation map may be updated with the new color for the segment of the route. In some aspects, the map data processing device may determine a characteristic for the segment of the route in response to determining that the navigation score for the segment of the route increases by more than the threshold value and/or update the display of the navigation map with the characteristic for the segment of the route.

In some aspects, determining the one or more colors for each navigation score may be based on a comparison of the navigation score for the segment of the route with a historical navigation score for the segment of the route. In additional aspects, the display of the navigation map may comprise a display of a user-selectable graphical user interface (GUI) element for a segment. The display of the navigation map may be configured to display one or more of the historical factors or the real time factors used to calculate the navigation score for the segment in response to a selection of the user-selectable GUI element.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
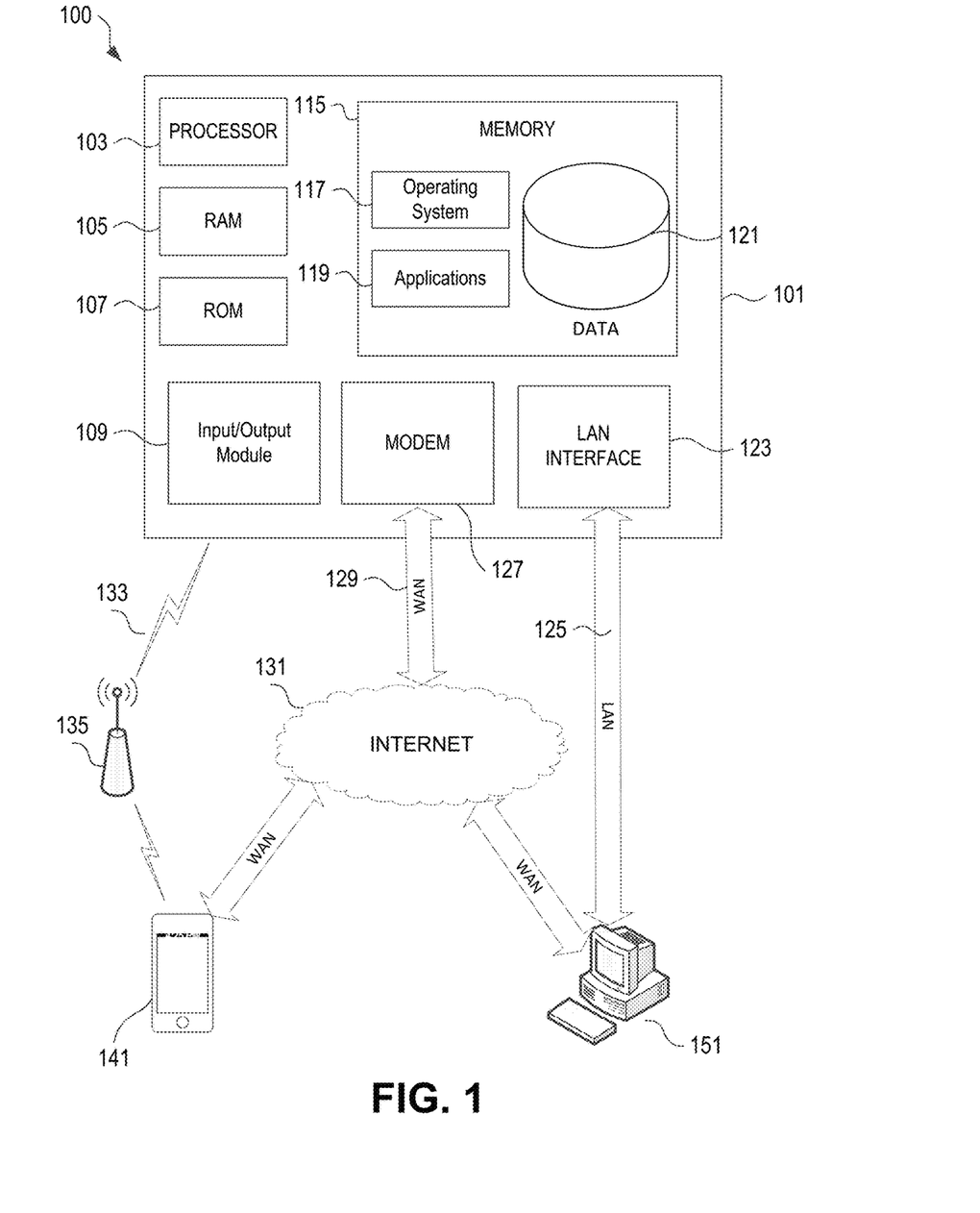
FIG. 1 illustrates a network environment and computing systems that may be used to implement aspects of the disclosure.

FIG. 1 illustrates a block diagram of a computing device 101 in a live risk map generation system 100 that may be used according to one or more illustrative embodiments of the disclosure. The computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as live risk map generation devices or systems, configured as described herein for receiving vehicle data, real time data, and historical data, and using the data to generate live risk maps.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the computing device 101 to execute a series of computer-readable instructions to receive vehicle data, real time data, and historical data, process the data, and use the data to generate live risk maps.

The computing device 101 may operate in a networked environment 100 supporting connections to one or more remote computers, such as terminals/devices 141 and 151. Live risk map generation computing device 101, and related terminals/devices 141 and 151, may include devices installed in vehicles, mobile devices that may travel within vehicles, or devices outside of vehicles that are configured to receive and process real time and historical data. Thus, the computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and risk map generation system components described herein may be configured to communicate using any of these network protocols or technologies.

Additionally, one or more application programs 119 used by the computing device 101 may include computer executable instructions (e.g., real time and historical data analysis programs, risk map generation algorithms, and the like) for receiving real time and historical data, generating live risk maps, and performing other related functions as described herein.

Figure 2:
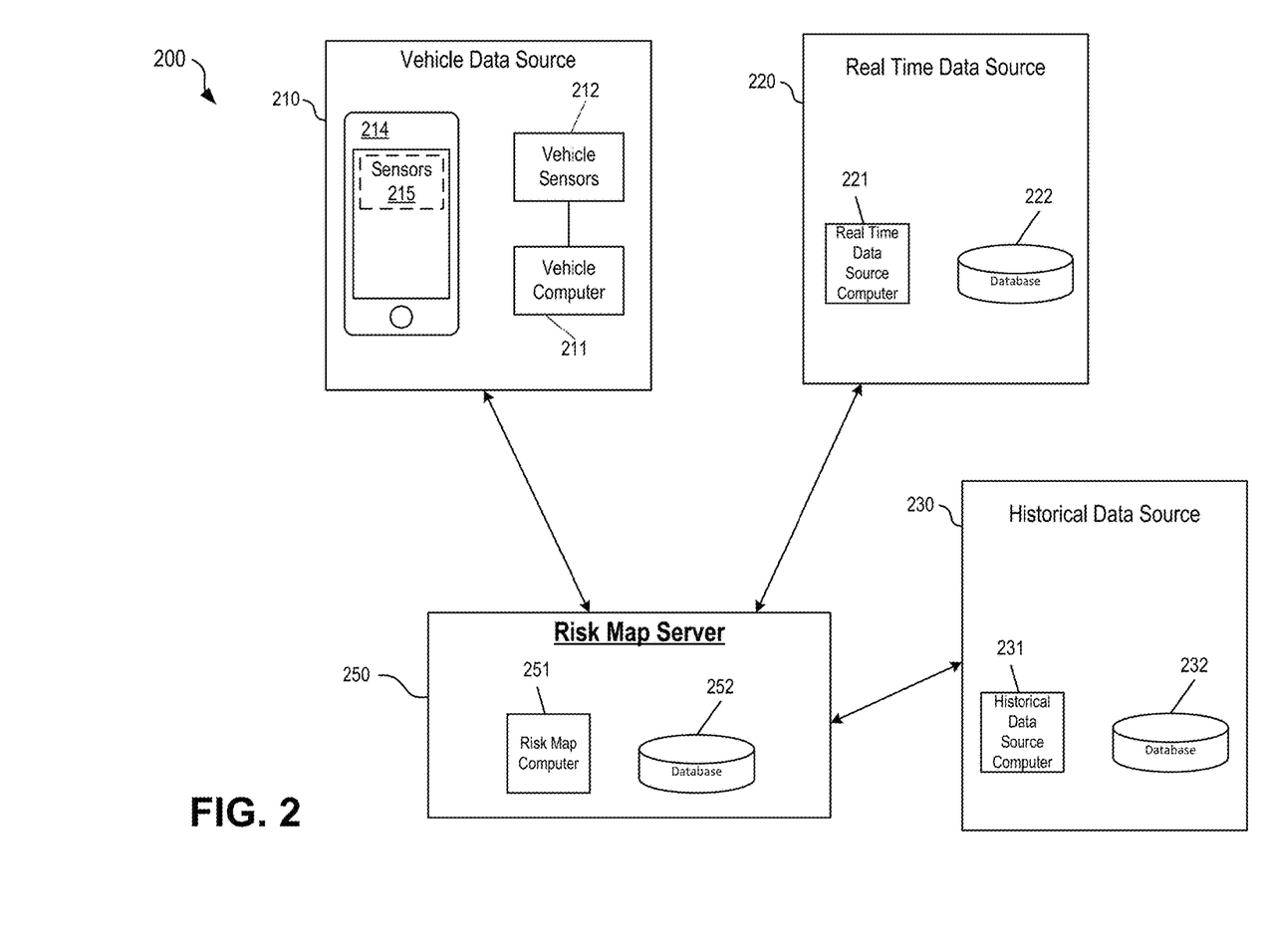
FIG. 2 is a diagram illustrating various example components of a risk map generation system according to one or more aspects of the disclosure.

FIG. 2 is a diagram illustrating various example components of a risk map generation system 200 according to one or more aspects of the disclosure. The risk map generation system 200 may include a vehicle data source 210 (e.g., a vehicle and its associated sensors 212 or a mobile device located within the vehicle), a mobile computing device 214, other vehicle data sources (not illustrated), a real time data source 220, a historical data source device 230, a map data processing device (e.g., a risk map server) 250, and additional related components. Each component shown in FIG. 2 may be implemented in hardware, software, or a combination of the two. Additionally, each component of the risk map generation system 200 may include a computing device (or system) having some or all of the structural components described above for computing device 101.

The system 200 may include a vehicle data source 210, containing some or all of the hardware/software components as the computing device 101 depicted in FIG. 1. The vehicle data source 210 may comprise a vehicle having a vehicle computer 211 and vehicle sensors 212. While one vehicle is illustrated, vehicle data may be collected from a plurality of vehicles. The vehicle sensors 212 may sense driving data, such speed, acceleration, rotation, braking, etc. The vehicle sensors 212 may also comprise a location determining device, such as a Global Positioning System (GPS), cellular position device, or any other position determining device, used to determine the location of the vehicle 210. The vehicle computer 211 may collect the driving data from the vehicle sensors 212 and send the data to the risk map server 250 for processing, as will be described in further detail below.

The system 200 may include a mobile computing device 214, containing some or all of the hardware/software components as the computing device 101 depicted in FIG. 1. The mobile computing device 214 (e.g., a mobile phone, a tablet, a wearable, etc.) may be located inside of a vehicle and thus be configured to sense and monitor driving data. For example, the sensors 215 of the mobile computing device 214 may sense driving data, such speed, acceleration, rotation, braking, etc. The sensors 215 may also comprise a location determining device, such as GPS, cellular etc., used to determine the location of the mobile computing device 214 (and consequently vehicle 210). The mobile computing device 214 may collect the driving data from the sensors 215 and send the data to the risk map server 250 for processing, as will be described in further detail below.

The system 200 may include a real time data source 220, containing some or all of the hardware/software components as the computing device 101 depicted in FIG. 1. Real time data source 220 may comprise a real time data source computer 221 for receiving and/or processing real time data, as will be described in further detail below. The real time data source 220 may also comprise a database 222 used to store the real time data collected by the real time data source computer 221. The real time data source computer 221 may transmit the real time data to the risk map server 250 for processing, as will be described in further detail below.

The system 200 may include a historical data source 230, containing some or all of the hardware/software components as the computing device 101 depicted in FIG. 1. Historical data source 230 may comprise a historical data source computer 231 for receiving and/or processing historical data, as will be described in further detail below. The historical data source 230 may also comprise a database 232 used to store the historical data collected by the historical data source computer 231. The historical data source computer 231 may transmit the historical data to the risk map server 250 for processing, as will be described in further detail below.

The system 200 may include a risk map server 250, containing some or all of the hardware/software components as the computing device 101 depicted in FIG. 1. The risk map server 250 may include hardware, software, and network components to receive data from one or more data sources, such as the vehicle data source 210 (e.g., via vehicle computer 211), mobile computing device 214, real time data source 220, historical data source 230, and other data sources. The risk map server 250 may include a database 252, which may include additional data for the risk map server 250 to process to, for example, generate one or more risk maps. The risk map computer 251 may analyze data received from the various data sources. The risk map server 250 may initiate communication with and/or retrieve data from the vehicle data source 210, mobile computing device 214, real time data source 220, historical data source 230 wirelessly, or by way of separate computing systems over one or more computer networks (e.g., the Internet).

Figure 3:
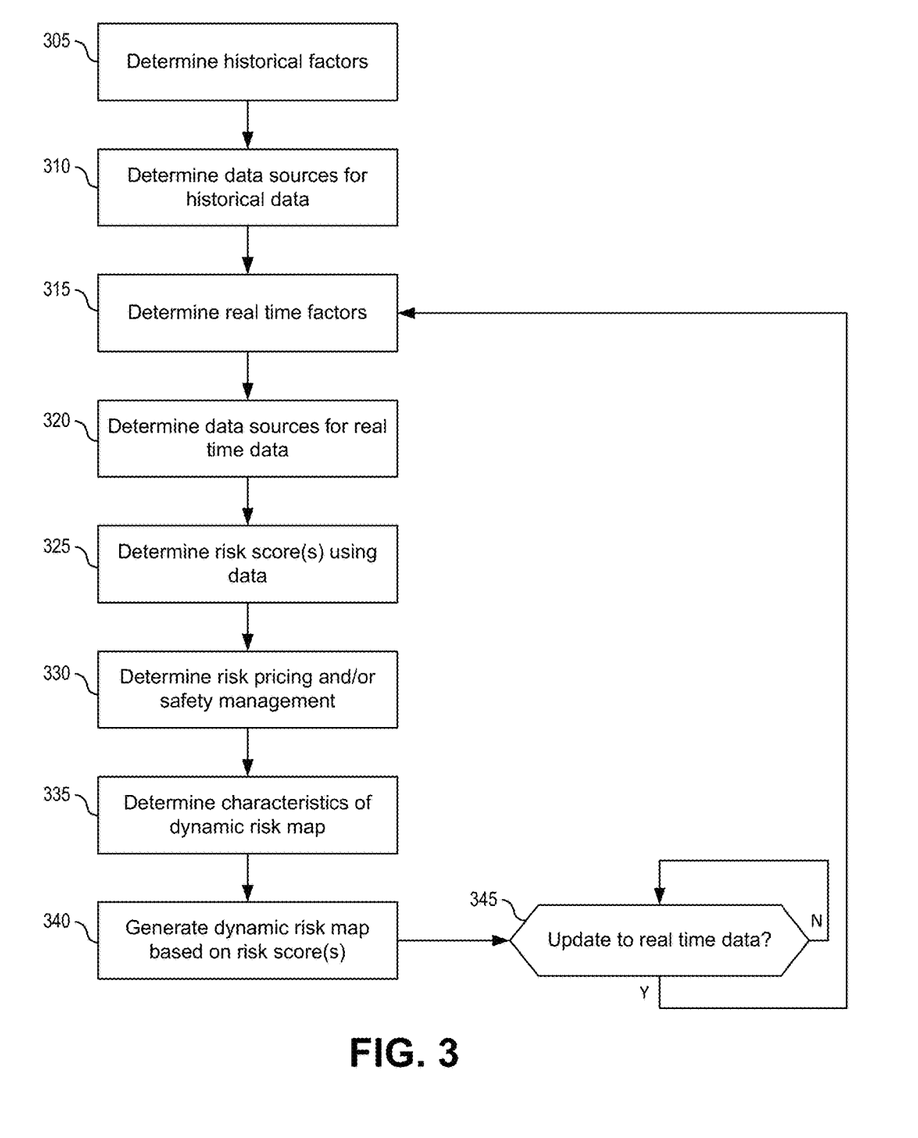
FIG. 3 is a flow diagram illustrating an example method of generating a dynamic risk map according to one or more aspects of the disclosure.

FIG. 3 is a flow diagram illustrating an example method of generating a dynamic risk map according to one or more aspects of the disclosure. The steps illustrated in FIG. 3 may be performed by a computing device, such as the risk map computer 251.

In step 305, the computing device may determine historical factors for determining risk value(s). Exemplary historical factors and/or data include historic accident historic accident data (e.g., type and severity of accidents based on location and environmental conditions), historic traffic (e.g., congestion data), historic vehicle volume and/or density, road characteristics, and historic weather data.

In step 310, the computing device may determine data source(s) having data corresponding to historical factors and access the historical data from the data source(s). An exemplary data source includes a data repository at the risk map server 250 (e.g., the database 252) or otherwise directly available to the risk map computer 251. For example, the database 252 may store accident claims data, which may indicate the day and time of an accident, the location of the accident, and other information describing the accident. Other data sources include third party or partner repositories. For example, the risk map computer 251 may access publically available information, such as from one or more department of transportation (DOT) data sources.

In step 315, the computing device may determine real time factors for determining risk value(s). Numerous real time factors exist, and these real time factors may affect how the computing device determines risk scores (as will be described below in further detail). Real time factors may comprise real time traffic flow information, such as vehicle speed, vehicle density, vehicle volume, and the like. Real time factors may also include weather data, such as whether there is precipitation (e.g., rain or snow) at the location of the vehicle and the rate of precipitation (e.g., 1 inch per hour). The weather data may also indicate changes in the weather, whether the changes occurred in the near past, are occurring in the present, or are forecasted to occur in the future. Real time factors may also indicate accidents, road closures (e.g., emergency road closures), construction zones (e.g., a few minutes or a few hours ago), and the like. The real time factors may include data indicating planned events for particular locations, such as marathons, concerts, etc.

Real time factors may also include real time driving data. For example, real time data may indicate a driver's behavior patterns (or preferences), such as braking patterns, acceleration patterns, speed patterns, and the like. Other driving data may include GPS trace data, driver ID, time, speed, heading, etc. The computing device may collect this data from sensors on board a vehicle (e.g., vehicle behavior sensors) or mobile devices within vehicles (e.g., a mobile phone). The data collected may comprise, for example, consumer or GPS probe data. Real time data may also be collected from autonomous driving platforms, such as autonomous vehicles or data sources monitoring autonomous vehicles. Real time data sources may also indicate driver coaching or safety guidance attributes.

In step 320, the computing device may determine data sources having data corresponding to real time factors and accesses the real time data. Data sources may include, for example, vehicles, mobile devices located within vehicles, on road sensors or other traffic devices (e.g., counters, cameras, traffic lights, speed cameras, and the like), weather service data sources, or other real time data sources. For example, a third party real time data source and computing device may collect and/or aggregate data from multiple real time data sources and send the data to the risk map server 250 for processing.

In step 325, the computing device may determine navigation score(s) (e.g., risk score(s)) using the real time data and/or the historical data. Vehicles may present various types of risks, and a risk score may be generated for each type of risk. The computing device may also generate an aggregate or combined risk score that factors in two or more types of risk. One type of risk is the risk of driving, which may include accidents, congestion, and the like. Another type of risk may comprise non-driving use risks. Risk scores may indicate the level of risk to, for example, bicycles near the vicinity of one or more vehicles, motorcycles, pedestrians, farm equipment, etc. There may be a risk of a vehicle running into people or things. For example, the risk to pedestrians may increase as the number or density of pedestrians increases in a particular area.

Another risk may be the risk of using a roadway network in an aggregated way, such as deploying fleets of vehicles effectively. The risk to fleets may vary based on traffic conditions, weather conditions, vehicle density, and the like. Ride sharing services or other transportation services may use this risk information to route and deploy their vehicles in a safer and more efficient manner than competition. A delivery service may use this information to handle deliveries more efficiently.

Another risk may be reduced using the risk data (e.g., risk score) to optimize road infrastructure usage from DOTs, other government authorities, or third parties. For example, construction companies or government entities may use the risk data to determine when to perform construction on buildings or roads or build a new bike lane, which may result in street closures. City planners may similarly use this data to determine whether to construct new bike lanes, how to structure traffic lights, and when or how to deploy traffic management personnel.

The risk score may comprise a multi-dimensional risk score, such as the multi-dimensional risk score described in U.S. Provisional Patent Application Ser. No. 62/274,835, filed Jan. 5, 2016 and entitled, "Multi-Dimensional Risk Scoring Model," and/or the multi-dimensional risk score described in U.S. patent application Ser. No. 15/182,955 entitled "Data Processing System Communicating With A Map Data Processing System To Determine Or Alter A Navigation Path Based On One Or More Road Segments" and filed Jun. 15, 2016. The related applications are herein incorporated by reference in their entirety.

In step 330, the computing device may determine risk pricing (e.g., insurance rates) and/or generate safety management recommendations (e.g., safety products to offer) based on the risk score(s) or other risk data. Risk pricing may comprise a consumer risk score, which may be similar to credit scores. The consumer risk score may be based on one or more of the factors described herein. The risk data may be used to reduce commercial insurance rates by a certain percentage (e.g., 10%) if the consumer uses the risk management services described herein.

The risk pricing data determined by the computing device may be used to generate an in-car insurance marketplace. Insurance companies may bid on consumers' business. As an OEM, the revenue share from the insurance marketplace may increase the value of a vehicle. The risk pricing data may be used to determine autonomous car hybrid coverage. For example, the risk score may be used to determine product liability or commercial premiums. Whether the car is driving, or the driver is at the wheel, the insurance company may have the vehicle covered. Manufacturers of autonomous vehicles may build the next version of self-driving cars with confidence because of the liability insurance.

The risk data may be used for managing fleet risk. For example, the system described herein may generate and send a risk-informed route optimization and driver safety management to fleet companies, large or small. That is, the routing may be risk-informed and based on driver scores. An insurance company may offer insurance friendly route optimization.

Consumer solutions for road safety may also be provided based on the risk data. Road safety solutions may include safe routing, parking, driving, informed texting and driver scoring/coaching, and the like.

The risk scores may be used by the computing device to manage car sharing risk. For a ride or car sharing service, drivers may keep customers safer by following safe routes (e.g., routes with lower risk scores) during trips that are recommended by the system.

The computing device may also determine real estate location risk scoring, including for both traditional and online real estate brokers. Lenders may pay for risk-related information, such as traffic volumes, accident history, and the like. Prospective buyers of real estate assets may also use this information. A commercial lender may be able to incorporate more comprehensive risk location profile data into financing models for borrowers. First time home buyers may access a location risk profile for the area surrounding a prospective home to be purchases, which may be as valuable as school ratings for the area.

City planners and/or government agencies may also be able to use the risk data. For example, the risk data may be used by government transportation management to optimize infrastructure, determine which roadways to prioritize fixing, and to learn more about dangers on the road because of alerts received from the city.

The risk data may also be used to optimize delivery of service, including a roadside assistance service. For example, delivery of service may be optimized by positioning vehicles (e.g., tow trucks) in high risk areas. Drivers needing assistance may be surprised how quickly a tow truck arrives. As a tow truck operator, the risk data may be used to increase tow truck productivity by a certain amount, such as 20%.

As will be described below in further detail, the risk data (e.g., risk scores) may be presented to users as one or more risk maps.

In step 335, the computing device may determine one or more characteristics of a dynamic risk map to be generated. The risk map may indicate, among other characteristics, risk scores for one or more segments of a road, such as on a route from an origin location to a destination location. As will be described in further detail below, the risk map may comprise a dynamic risk map. The risk map may display the causal effect on risk and one or more of the factors outlined above. For example, the data to be generated and displayed, in real time, may include map service data, such as routing data, analytics, updates, and other map data. The data displayed may also include location, time, behavior, and/or environment data.

The computing device may determine characteristics of the map to display, such as the causal effect on real time risk on a live map. For example, traffic congestion and/or navigation or risk scores may be represented by different colors on the dynamic map, such as red (heavy congestion or high risk), white (medium congestion or medium risk), or blue (low congestion or low risk). Any number of colors may be displayed on the dynamic map, and each color may represent a different navigation or risk score. The computing device may change the colors on the map as traffic congestion and/or risk scores change. Risk scores and traffic congestion may be represented in other ways, such as hot spots (e.g., gradient colors similar to weather Doppler radar views). Additionally or alternatively, lane level risks may be highlighted on the dynamic map.

The computing device may determine to use other visualization techniques. For example, the dynamic map may comprise one or more bubbles (or other prompts containing data such as text) that pop up on the map. The prompts may include various data, such as the risk score for a particular roadway segment on the map, historical factors or historical data used by the computing device to determine the risk score, real time factors or real time data used to determine the risk score, risk pricing or safety management information, and the like. In some aspects, the data prompts may automatically disappear on the fly as new information (e.g., real time information) surfaces.

The computing device may also use drilldown displays. For example, the first bubble displayed may indicate the risk score for a segment. If the user selects the risk score or other GUI element in the bubble, the map may display which factors (e.g., historical and/or real time factors) and/or which data (e.g., historical and/or real time data) were used to generate the risk score. As previously explained, toggles may be provided so that a user may turn on or turn off each factor used to calculate a risk score. These toggles may also be displayed on the dynamic map, such as in one of the drilldown displays.

The live risk map may display how (quantified) risk moves across the map. A risk flow may be displayed, and the risk flow may indicate how risk flows along the road segments as traffic congestion unfolds or backs up on the road. For example, a wave form visual construct may be displayed and may be based on a mathematical model that applies to road risk flow. The map may display a wave moving jam and how traffic accidents may move like a waveform.

The dynamic may comprise a dial or other GUI element used to move backwards and forwards in time. As time changes according to the dial, the map may change the risk scores displayed according to the time. For example, a user may move the time on map via the dial (e.g., in 10 minute increments), and the user may see the risk scores move up and down in a waveform-like manner based on computations performed by the computing device.

The dynamic map may include a predictive view that may be useful for determining when to deploy fleets or when to drive. For example, the present time may be 10:40 AM, and the user may desire to see how the risk fluctuates between 10:45 AM and noon to determine when to deploy a fleet (e.g., a ride sharing fleet, a delivery truck fleet, etc.). As previously explained, drilldown information may be displayed, and the user may be able to toggle each factor considered in determining the risk score. Thus, the user may determine which factors are more important and which factors are less important when deciding to deploy a fleet.

In step 340, the computing device may generate one or more dynamic risk map based on risk score(s). The risk map may comprise a representation of risk (e.g., risk score or factors) based on location, weather, traffic, context and other variables. The dynamic risk map may include any one or more of the characteristics described above with reference to step 335, such as colors, drilldown displays, toggles, etc. In other words, the system described herein may generate a dynamic map that demonstrates the causal effect on risk of various factors, including real-time factors such as weather, traffic, road closures, construction, planned closures, and the like. Various data attributes and real-time values may be displayed on the dynamic map.

Maps may be generated for individual users, such as commuters before or after they begin driving. The maps may also be generated for business-to-business users, such as a logistics company, a ride sharing company, and the like. As described above, the map and its associated information may be used to determine when to deploy a fleet, such as to deliver packages.

In step 345, the computing device may determine whether there is an update or other change to the real time data. If so (step 345: Y), the computing device may proceed to step 315 to determine real time factors for recalculating a risk score (or alternatively to step 320 to retrieve the updated data directly). In other words, the map may comprise a live, dynamic risk map that updates in real time based on changes to real time data and potentially based on changes to historical data.

In some aspects, the computing device may use thresholds to determine whether to update the data on the dynamic risk map. The thresholds may be predetermined or algorithmically determined. If a threshold is exceeded, the computing device may determine to update the risk map. For example, if traffic at a particular location is backed up by certain amount (e.g., above a threshold amount), the computing device may determine to update the risk map data. As another example, if traffic exceeds a threshold amount and the computing device determines that one or more other factors is satisfied (e.g., if there is snow on the road), the computing device may update the risk map data. If, on the other hand, a threshold is not exceeded, the computing device may determine not to update the risk map.

Whether the computing device updates the risk map may be based on the risk score exceeding a risk score threshold. For example, if a risk score increases by 40% at a particular location (e.g., a road segment), the computing device may determine to update the map. As another example, if the risk score is 40% higher than a historical average risk score for the same location, the computing device may update the risk map. The computing device may also consider one or more other factors, such as if snow, rain, and the like is present before determining to update the data on the map. Colors for each navigation score may be based on a comparison of the navigation score for the segment of the route with a historical navigation score for the segment of the route. One color on the map may indicate that the current risk level is on par with a historical risk score average. Another color may indicate that the current risk level is below a historical average by a certain threshold. A third color may indicate that the current risk level is above a historical average by a certain threshold.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
    a historical data source comprising:
       a historical data source computer; and
       a database storing historical data comprising one or more of historical vehicle accident data, historical traffic data, historical vehicle volume data, historical vehicle density data, historical road characteristic data, or historical weather data;
    a map data processing device comprising:
       a map data processing computer; and
       memory storing computer-executable instructions that, when executed by the map data processing computer, cause the map data processing device to:
          determine, based on location data from a location sensor, a location of a vehicle;
          based on the location of the vehicle, determine one or more historical factors;
          receive, from the historical data source and for the location of the vehicle, historical data associated with the one or more historical factors, wherein the historical data comprises one or more of historical vehicle accident data, historical traffic data, historical vehicle volume data, historical vehicle density data, historical road characteristic data, or historical weather data;
          based on the location of the vehicle, calculate one or more real time factors and real time data associated with the one or more real time factors;
          calculate, based on the one or more historical factors and the one or more real time factors, a navigation score for each segment of a route from the location of the vehicle to a destination location;
          determine one or more characteristics for each navigation score based on a comparison of the navigation score for the segment of the route with a historical navigation score for the segment of the route; and
          generate a display of a navigation map comprising the one or more characteristics.

2. The system of claim 1, wherein the memory stores computer-executable instructions that, when executed by the map data processing computer, cause the map data processing device to:
    in response to an update to the real time data, recalculate at least one of the navigation scores.

3. The system of claim 1, wherein the memory stores computer-executable instructions that, when executed by the map data processing computer, cause the map data processing device to:
    determine that the navigation score for a segment of the route increases by more than a threshold value; and
    in response to determining that the navigation score for the segment of the route increases by more than the threshold value, determine a new characteristic for the segment of the route and update the display of the navigation map with the new characteristic for the segment of the route.

4. The system of claim 1, wherein the memory stores computer-executable instructions that, when executed by the map data processing computer, cause the map data processing device to:
    determine that the navigation score for a segment of the route increases by more than a threshold value; and
    in response to determining that the navigation score for the segment of the route increases by more than the threshold value, determine a characteristic for the segment of the route and update the display of the navigation map with the characteristic for the segment of the route.

5. The system of claim 1, wherein the memory stores computer-executable instructions that, when executed by the map data processing computer, cause the map data processing device to:
    in response to an update to the real time data, recalculate a plurality of the navigation scores.

6. The system of claim 1, wherein the display of the navigation map comprises a display of a user-selectable graphical user interface (GUI) element for a segment, wherein the display of the navigation map is configured to display one or more of the historical factors or the real time factors used to calculate the navigation score for the segment in response to a selection of the user-selectable GUI element.

7. The system of claim 1, wherein the memory stores computer-executable instructions that, when executed by the map data processing computer, cause the map data processing device to:
    receive the location data from the location sensor, wherein a mobile computing device or the vehicle includes the location sensor.

8. A method comprising:
    determining, based on location data from a location sensor, a location of a vehicle;
    based on the location of the vehicle, determining, by a map data processing device, one or more historical factors;
    receiving, from a historical data source and for the location of the vehicle, historical data associated with the one or more historical factors, wherein the historical data comprises one or more of historical vehicle accident data, historical traffic data, historical vehicle volume data, historical vehicle density data, historical road characteristic data, or historical weather data;
    based on the location of the vehicle, calculating, by the map data processing device, one or more real time factors and real time data associated with the one or more real time factors;
    calculating, based on the one or more historical factors and the one or more real time factors, a navigation score for each segment of a route from the location of the vehicle to a destination location;
    determining one or more characteristics for each navigation score based on a comparison of the navigation score for the segment of the route with a historical navigation score for the segment of the route; and
    generating a display of a navigation map comprising the one or more characteristics.

9. The method of claim 8, further comprising:
    in response to an update to the real time data, recalculating at least one of the navigation scores.

10. The method of claim 8, further comprising:
    determining that the navigation score for a segment of the route increases by more than a threshold value; and
    in response to determining that the navigation score for the segment of the route increases by more than the threshold value, determining a new characteristic for the segment of the route and update the display of the navigation map with the new characteristic for the segment of the route.

11. The method of claim 8, further comprising:
determining that the navigation score for a segment of the route increases by more than a threshold value; and
in response to determining that the navigation score for the segment of the route increases by more than the threshold value, determining a characteristic for the segment of the route and update the display of the navigation map with the characteristic for the segment of the route.

12. The method of claim 8, further comprising:
in response to an update to the real time data, recalculating a plurality of the navigation scores.

13. The method of claim 8, wherein the display of the navigation map comprises a display of a user-selectable graphical user interface (GUI) element for a segment, wherein the display of the navigation map is configured to display one or more of the historical factors or the real time factors used to calculate the navigation score for the segment in response to a selection of the user-selectable GUI element.

14. The method of claim 8, further comprising:
receiving the location data from the location sensor, wherein a mobile computing device or the vehicle includes the location sensor.

15. A map data processing device comprising:
a map data processing computer; and
memory storing computer-executable instructions that, when executed by the map data processing computer, cause the map data processing device to:
determine, based on location data from a location sensor, a location of a vehicle;
based on the location of the vehicle, determine one or more historical factors;
receive, from a historical data source device and for the location of the vehicle, historical data associated with the one or more historical factors, wherein the historical data comprises one or more of historical vehicle accident data, historical traffic data, historical vehicle volume data, historical vehicle density data, historical road characteristic data, or historical weather data;
based on the location of the vehicle, calculate one or more real time factors and real time data associated with the one or more real time factors;
calculate, based on the one or more historical factors and the one or more real time factors, a navigation score for each segment of a route from the location of the vehicle to a destination location;
determine one or more characteristics for each navigation score based on a comparison of the navigation score for the segment of the route with a historical navigation score for the segment of the route; and
generate a display of a navigation map comprising the one or more characteristics.

16. The map data processing device of claim 15, wherein the memory stores computer-executable instructions that, when executed by the map data processing computer, cause the map data processing device to:
in response to an update to the real time data, recalculate at least one of the navigation scores.

17. The map data processing device of claim 15, wherein the memory stores computer-executable instructions that, when executed by the map data processing computer, cause the map data processing device to:
determine that the navigation score for a segment of the route increases by more than a threshold value; and
in response to determining that the navigation score for the segment of the route increases by more than the threshold value, determine a new characteristic for the segment of the route and update the display of the navigation map with the new characteristic for the segment of the route.

18. The map data processing device of claim 15, wherein the memory stores computer-executable instructions that, when executed by the map data processing computer, cause the map data processing device to:
determine that the navigation score for a segment of the route increases by more than a threshold value; and
in response to determining that the navigation score for the segment of the route increases by more than the threshold value, determine a characteristic for the segment of the route and update the display of the navigation map with the characteristic for the segment of the route.

19. The map data processing device of claim 15, wherein the memory stores computer-executable instructions that, when executed by the map data processing computer, cause the map data processing device to:
in response to an update to the real time data, recalculate a plurality of the navigation scores.

20. The map data processing device of claim 15, wherein the display of the navigation map comprises a display of a user-selectable graphical user interface (GUI) element for a segment, wherein the display of the navigation map is configured to display one or more of the historical factors or the real time factors used to calculate the navigation score for the segment in response to a selection of the user-selectable GUI element.

* * * * *

UNITED STATES PATENT AND TRADEMARK OFFICE
CERTIFICATE OF CORRECTION

PATENT NO. : 10,036,650 B2  
APPLICATION NO. : 15/409693  
DATED : July 31, 2018  
INVENTOR(S) : Sunil Chintakindi et al.

Page 1 of 1

It is certified that error appears in the above-identified patent and that said Letters Patent is hereby corrected as shown below:

On the Title Page

Column 1, (63) Related U.S. Application Data, Line 2:
Delete "which is" and insert -- and --

Signed and Sealed this
Twenty-third Day of October, 2018

Andrei Iancu
*Director of the United States Patent and Trademark Office*